United States Patent [19]

Dodd

[11] 4,449,626

[45] May 22, 1984

[54] POULTRY CONVEYOR

[76] Inventor: Ned T. Dodd, Rte. 2, Lula, Ga. 30554

[21] Appl. No.: 305,097

[22] Filed: Sep. 24, 1981

[51] Int. Cl.³ ............................................. B65G 27/08
[52] U.S. Cl. .................................... 198/765; 198/763; 198/771
[58] Field of Search ................ 198/759, 765, 771, 763, 198/750

[56] References Cited

U.S. PATENT DOCUMENTS

| | | | |
|---|---|---|---|
| 1,971,292 | 8/1934 | Brauer | 198/771 |
| 2,656,037 | 10/1953 | Bergmann | 198/765 |
| 2,833,389 | 5/1958 | Bergmann | 198/771 |
| 3,338,385 | 8/1967 | Sage | 198/771 |
| 3,452,400 | 7/1969 | Kane et al. | 198/763 |
| 3,570,773 | 3/1971 | Schneider et al. | 198/771 |
| 4,055,245 | 10/1977 | Sundberg | 198/750 |
| 4,260,051 | 4/1981 | Burghart | 198/763 |
| 4,355,580 | 10/1982 | Scheel | 295/34 |

Primary Examiner—Robert J. Spar
Assistant Examiner—Jonathan D. Holmes
Attorney, Agent, or Firm—B. J. Powell

[57] ABSTRACT

A poultry conveyor for conveying birds in a poultry processing plant including a support frame, an elongate conveying trough, mounting means movably mounting the conveying trough on the support frame for movement along a generally horizontal path with the trough being inclined with respect to the horizontal, and drive means for reciprocally moving the conveying trough along the generally horizontal path to cause birds deposited in the conveying trough to be moved along the trough in a given direction.

7 Claims, 10 Drawing Figures

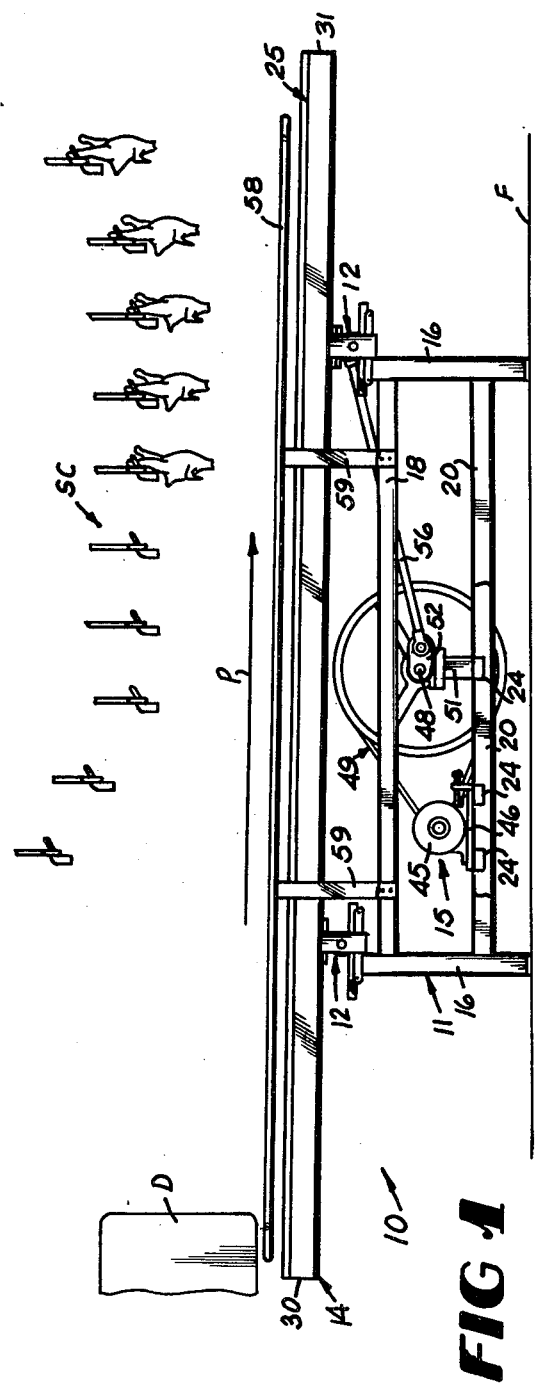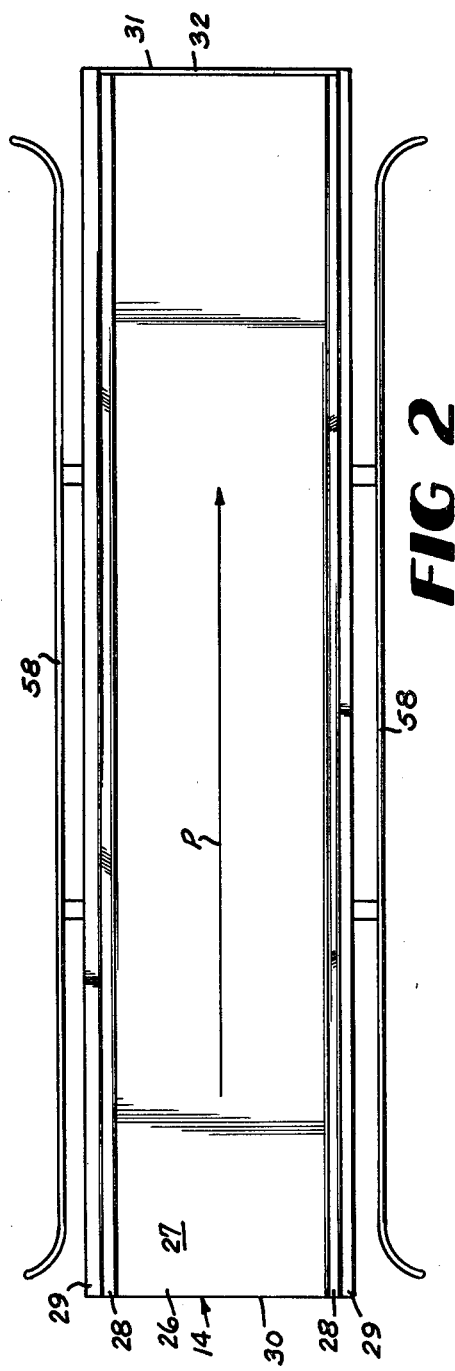

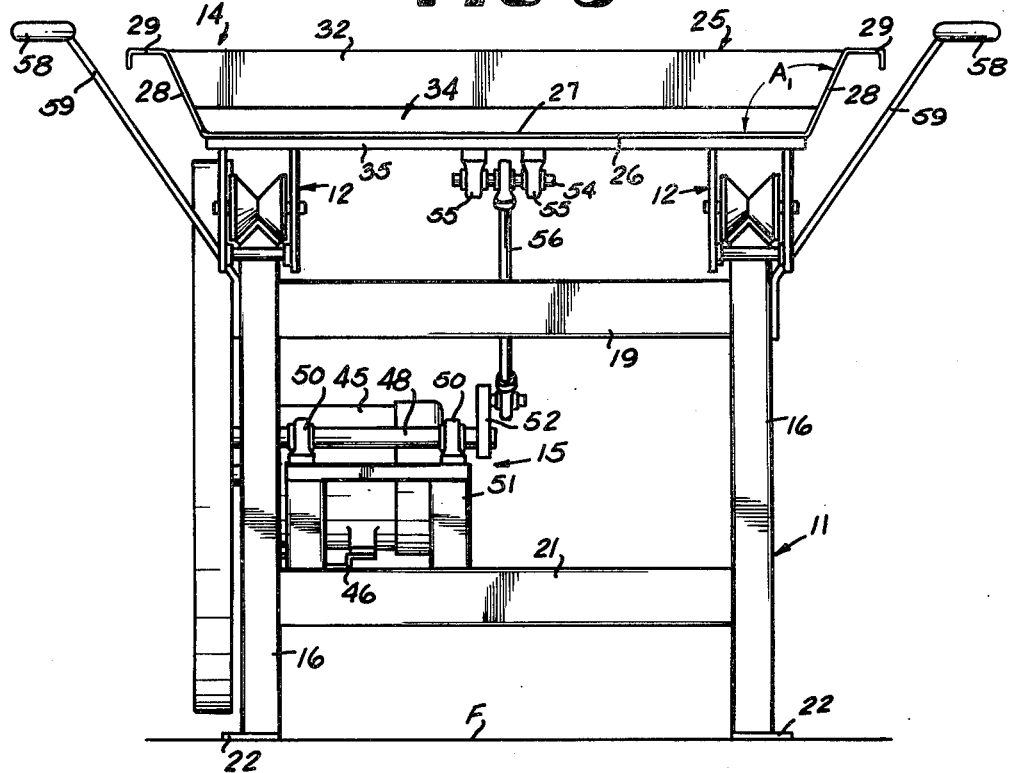
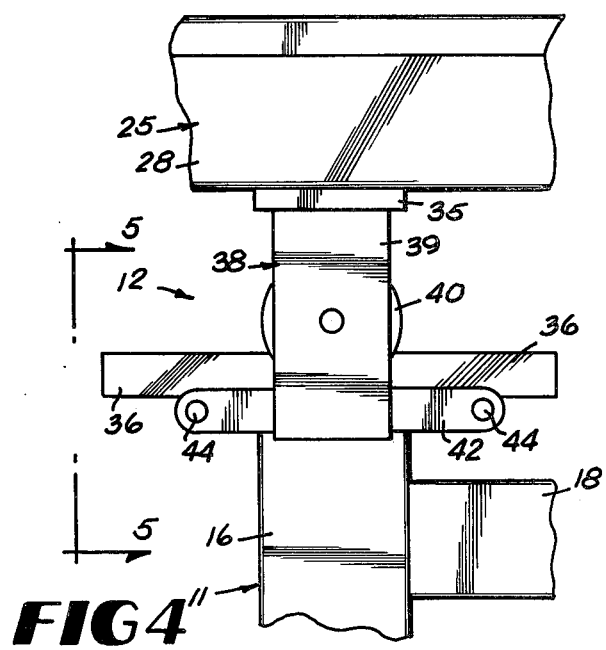
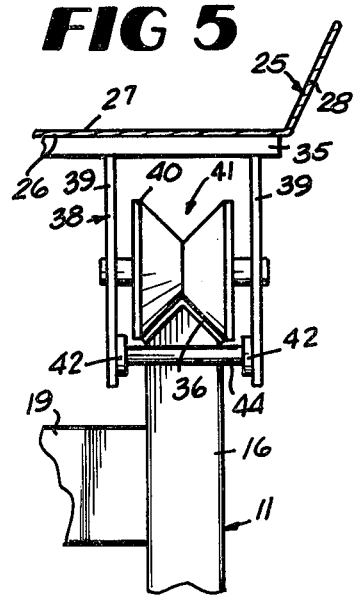

POULTRY CONVEYOR

BACKGROUND OF THE INVENTION

It is frequently necessary to convey birds and bird parts in poultry processing plants between the different processing operations with conveyors. Typically, the birds are automatically loaded onto the conveyor at the end of a processing operation and are then manually unloaded from the conveyor for subsequent processing operations. Frequently, manual grading operation is carried on as the birds are manually unloaded from the conveyor, thereby requiring that the birds be presented to the operator for manual inspection at a speed such that the manual inspection can be carried out. Also, the conveyor must be able to convey the birds without damaging the birds.

These conveying operations have, in the past, been performed by belt conveyors on which the birds are transported. One of the problems with these belt conveyors is that it is difficult to maintain the belts used on the conveyors sufficiently clean to meet governmental regulations. These belts also tended to absorb moisture and bacteria, especially as the belt became worn, thereby requiring that the belt be frequently replaced. Moreover, these belt conveyors required a time consuming and frequent cleanup operation to maintain the belt conveyor operating in a governmental approved manner. As a result, the cost of maintaining such belt conveyors has been high and the maintenance thereof has been difficult to perform.

Attempts to use vibratory type conveyors have not met with success in the poultry processing industry because it was difficult to provide enough angle on the conveyor within the space available in the poultry processing plant to cause the birds to move down the conveyor. Further, these vibratory conveyors caused damage to the birds as they moved therealong due to the vibratory action of the conveyor. Further, it is difficult to maintain the conveyor at a convenient height so that the conveyor could be manually unloaded.

SUMMARY OF THE INVENTION

These and other problems and disadvantages associated with the prior art are overcome by the invention disclosed herein by providing a beltless conveyor which has the capability of transferring the birds in a poultry processing plant at a rate such that the birds can be manually unloaded from the conveyor and so that manual grading and inspection can be accommodated. The invention provides a reciprocating conveyor which moves birds at the desired rate for manual inspection, grading and unloading without damage to the birds. The reciprocating conveyor trough in which the birds are transported can be easily cleaned and does not absorb any moisture and bacteria from the poultry. Further, any water draining from the poultry can flow down the reciprocating conveyor trough to be separated from the birds.

The conveyor of the invention includes a support frame with an elongate conveyor trough reciprocally mounted on the upper end of the support frame so that the conveyor trough can be reciprocally moved along a horizontal rectilinear path with respect to the support frame. An eccentric drive is provided for reciprocating the conveyor trough back and forth along the horizontal rectilinear path with respect to the support frame at a rate of about 100–150 cycles per minute. The conveyor trough has a slight incline so that the birds are moved along the conveyor trough in a given direction as the conveyor trough is reciprocated. The conveyor trough has a bottom wall on which the birds are supported and upstanding side walls along opposite sides of the bottom wall to keep the birds on the bottom wall as they are moved thereon. In one embodiment of the conveyor trough, the bottom wall is flat. In another embodiment of the conveyor trough, the bottom wall has a plurality of longitudinally extending V-shaped sections therein with flat sections therebetween so that the birds are supported on the flat sections while liquids that drain from the birds can flow down the grooves formed in the V-shaped sections. In another embodiment of the conveyor trough, the bottom wall has a plurality of raised sections formed therein to assist in moving the birds along the conveyor trough as it is reciprocated.

These and other features and advantages of the invention disclosed herein will become more apparent upon consideration of the following specification and accompanying drawings wherein like characters of reference designate corresponding parts throughout the several views and in which:

BRIEF DESCRIPTION OF THE DRAWINGS

FIG. 1 is a side elevational view of a conveyor of the invention;

FIG. 2 is a top view thereof;

FIG. 3 is an enlarged end view thereof;

FIG. 4 is an enlarged side view of the mounting assembly of the invention;

FIG. 5 is a view taken generally along line 5—5 in FIG. 4;

Figure 6:
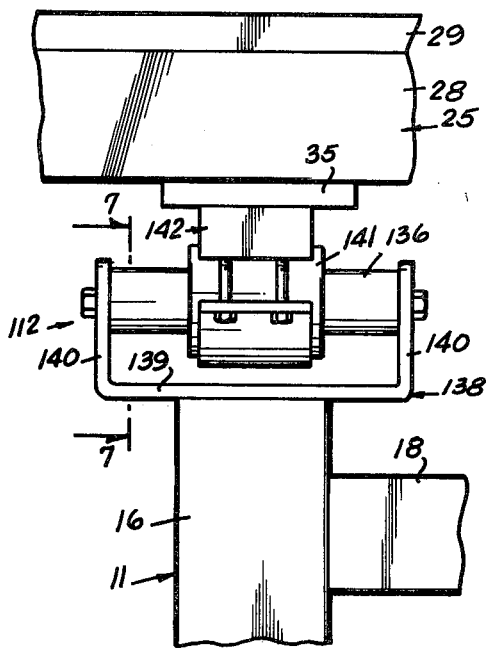
FIG. 6 is a side view of a second embodiment of the mounting assembly of the invention.

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

The conveyor 10 of the invention is used to transport birds and bird parts between different processing operations in a poultry processing plant. Some examples of the use of the conveyor 10 are to transport birds between the picking and eviscerating operations, to transport birds from the chilling operation to the draining operation, to transport birds from the chilling operation to the sizing operation, to transport birds to cut-up operations, and to transport birds and bird parts after processing to the packaging operations. Typically, the birds are automatically discharged from a processing operation onto one end of the conveyor 10 and are then manually unloaded from the conveyor 10 as the birds move along the conveyor to be introduced into the next processing operation. Frequently, the operators unloading the birds from the conveyor 10 also visually inspect and grade the birds as they are unloaded.

As an example of the use of the conveyor 10, FIG. 1 illustrates the conveyor 10 installed between a chilling operation and a sizing operation. The birds are discharged onto one end of the conveyor 10 by the discharge D from the chilling operation and then moved along the conveyor 10. The sizing conveyor or conveyors SC pass above the conveyor 10 so that the operators unloading the conveyor 10 can visually inspect the birds and grade them as the operators manually hang the birds on the shackles of the sizing conveyor or conveyors SC.

The conveyor 10 includes a support frame 11 supported on the processing plant floor F. Mounting assemblies 12 movably support a conveyor bed assembly 14 on top of the support frame 11 for reciprocal movement of the bed assembly 14 with respect to the support frame 11 along a rectilinear conveying path P. A drive assembly 15 mounted on the support frame 12 is operatively connected to the bed assembly to reciprocate the bed assembly 14 along the path P.

The support frame 11 includes four upstanding corner posts 16 which rest on the floor F at their lower ends. A pair of upper side members 18 and a pair of upper end members 19 are connected between posts 16 adjacent their upper ends. A pair of lower side members 20 and a pair of lower end members 21 are connected between the posts 16 a prescribed distance above the lower ends of the posts 16 to form the open rectangular frame 11. The lower ends of post 16 are provided with anchoring tabs 22 for use in attaching the frame 11 to the floor F. The path P along which the bed assembly 14 is reciprocated extends longitudinally of and above the support frame 11. A plurality of cross members 24 extend between the lower side members intermediate their ends to mount the drive assembly 15 thereon as will become more apparent.

The conveyor bed assembly 14 includes an elongate conveyor trough 25 with a generally flat bottom wall 26 and a pair of upstanding side walls 28 integral with and extending along opposite side edges of the bottom wall 26. While the angle between the side walls 28 and the bottom wall 26 may be any convenient angle, the side walls 28 are shown extending up and away from the bottom wall 26 at an included angle $A_1$ of about 115°. The upper edge of each of the side walls 28 is provided with an outwardly projecting lip 29 which serves to reinforce the conveyor trough 25 and to protect the operators from injury as they unload the conveyor bed assembly 14. The conveyor trough 25 has an infeed end 30 which is located under the discharge D from the chilling operation so that the birds discharged from the discharge D will drop into the conveyor trough 25 between the side walls 28 and a downstream end 31 provided with an abutment member 32 connected between the side walls 28 on the trough 25 and extending across the trough 25 above the bottom wall 26 so that the birds moving along the trough 25 from the infeed end 30 to the downstream end 31 will be arrested by the abutment member 32. The opening 34 between the bottom of the abutment member 32 and the bottom wall 26 of the trough 25 allows liquids to drain out of the trough 25 as will become more apparent. If the birds are to be discharged out of the conveyor trough 25, the abutment member 32 will be eliminated. A pair of reinforcing plates 35 are connected to the bottom wall 26 under the trough 25 and extend transversely of the trough 25. The reinforcing plates 35 are spaced apart approximately the same distance as the distance between the corner posts 16 on opposite ends of the support frame 12 and are used to mount the conveyor trough 25 on the support frame 12 as will become more apparent.

The mounting assemblies 12 movably mount the conveyor trough 25 on the upper ends of the corner posts 16. There are four mounting assemblies 12 shown to mount the conveyor trough 25, one being associated with the upper end of each of the corner posts 16. Each of the mounting assemblies 12 includes an inverted V-shaped angle member 36 fixedly mounted on the upper end of the associated post 16 so that the angle member 36 extends longitudinally of the support frame 11. Each mounting assembly 12 also includes a mounting bracket 38 fixedly attached to the reinforcing plate 35 on the conveyor trough 25 extending over the angle member 36. The mounting bracket 38 includes a pair of spaced apart mounting plates 39 which project below plate 35 and rotatably mount a grooved roller 40 therebetween. The roller 40 defines a V-shaped groove 41 therearound sized to conform to the inverted V-shape of the angle member 36 so that the roller 40 is rotatably supported on the angle member 36. Thus, the conveyor trough 25 can be moved back and forth along the angle member 36 as the roller 40 rolls thereon. It will be noted that the V-shaped groove 41 in the roller 40 serves to maintain the conveyor trough 25 laterally fixed with respect to the frame 11 as the roller 40 rolls along with the angle member 36. The mouting plates 39 have a length such that they project below the roller 40 on opposite sides of the angle member 36. The lower end of each mounting plate 39 mounts an elongate keeper bracket 42 thereon oriented generally parallel to the angle member 36. Thus, the keeper brackets 42 are located on opposite sides of angle member 36. Each keeper bracket 42 projects equidistant outwardly from opposite side edges of the mounting plate carrying same. Opposite ends of the keeper brackets 42 on opposite sides of the angle member 36 are provided with keeper pins 44 that extend between the brackets 42 under the angle member 36 projecting from the post 16 to maintain the groove 41 in the roller 40 in conforming contact with the angle member 36. This limits the vertical movement of the roller 40 with respect to the angle member 36 to prevent the roller 40 from becoming disengaged with angle member 36. The keeper pins 44 are spaced apart sufficiently so that the keeper pins 44 do not engage opposite sides of the posts 16 as the conveyor trough 25 is reciprocated as will become more apparent.

The mounting assemblies 12 mount the conveyor trough 25 to that the longitudinal axis of the conveyor trough 25 lies above and generally in vertical registration with the longitudinal axis of the frame 11 so that the conveying path P extends along the length of the conveyor trough 25. The mounting assemblies 12 are also arranged so that the bottom wall 26 of the conveyor trough 25 angles slightly downwardly from the infeed end 30 to the downstream end 31 thereof while the angle members 36 are horizontally oriented. Thus, the mounting assemblies cause the trough 25 to move along a horizontal path as it is reciprocated back and forth but remains included as it is so reciprocated. This causes the birds to move along the bottom wall 26 of the trough 25 from the infeed end 30 to the downstream end 31 as will become more apparent. While the angle of inclination may be varied, it has been found that an angle such that there is a drop of about ⅛-174 inch per foot of length of the trough 25 is satisfactory to cause the birds to move down the trough at a rate such that they can be manually unloaded from the trough 25 as well as inspected and graded as will become more apparent.

Drive assembly 15 is mounted on the cross members 24 on the support frame 11 and is operatively connected to one of the reinforcing plates 35 on the bottom of the conveyor trough 25 for reciprocating the conveyor trough 25 back and forth along the conveying path P as the rollers 40 in the mounting assemblies 12 roll along the angle members 36 on the support frame 11. The drive assembly 15 includes a drive motor 45 mounted on an adjustment motor support 46 carried by a pair of the cross members 24. The output of the drive motor 45 is connected to an eccentric drive shaft 48 through a reducing belt and pulley arrangement 49 to reduce the speed of the eccentric drive shaft 48 with respect to the drive motor 45. The eccentric drive shaft 48 is rotatably journalled in bearings 50 mounted on a bearing support 51 carried on another of the cross members 24 so that the axis of the drive shaft 48 is horizontally oriented and extends transversely of the support frame 11. The belt and pulley arrangement 49 is connected to one end of the drive shaft 48 and the other end of the drive shaft 48 fixedly mounts an eccentric 52 thereon.

A driven shaft 54 is rotatably mounted in bearings 55 connected to the bottom one of the reinforcing plates 35 on the bottom of the conveyor trough 25 so that the drive shaft 54 extends transversely of the trough 25. The drive link 56 is pinned between the eccentric 52 and the driven shaft 54 so that the drive link 56 extends generally in vertical registration with the center-line of the conveyor trough 25. As the eccentric 52 is rotated, the drive link 56 reciprocally drives the conveyor 25 horizontally back and forth on the mounting assemblies 12. While the reciprocal stroke length of the conveyor trough 25 on assemblies 12 may be varied by varying the eccentricity of connection between the drive link 56 and the eccentric 52, it has been found that a stroke of 3-4 inches is satisfactory to move the birds along the trough 25.

The speed at which the birds are moved along the trough 25 is dependent on the reciprocal cycle speed, the stroke length, and the amount of drop per linear foot of the trough 25. It has been found that an average linear speed of about 3-6 inches per second is sufficiently slow for the conveyor trough 25 to be manually unloaded while allowing sufficient visual inspection to take place to grade the birds as they are unloaded from the conveyor trough 25. While the above noted dependencies may be varied within certain limits, it has been found that a reciprocal cycle speed of about 100-150 cycles per minute at the stroke length and drop per linear foot enumerated above produces an average linear speed with the above noted range. Preferably, the drop per linear foot in the conveyor trough should be as small as possible to minimize the uncontrolled movement of the bird down the trough and to permit easy inspection of the birds. The stroke length should be sufficient to insure that the bird is significantly moved with respect to the conveyor trough during each reciprocal cycle. The reciprocal cycle rate should be sufficient to effect movement of the bird with respect to the conveyor trough but should not be be great enough to move the bird too fast for visual inspection and unloading during the cycle. A drop of about 3/16 inch per linear foot, a stroke of about 3.5 inches, and a reciprocal cycle speed of about 110 cycles per minute have been found to produce an average linear speed of about 4.8 inches per second of bird travel therealong.

To protect the workers unloading the conveyor trough 25, guard rails 58 are provided along opposite sides of the trough. The guard rails 58 are positioned by mounting brackets 59 attached to the upper side members 18. The guard rails 58 are spaced outwardly of and generally parallel to the lips 29 on the trough 25.

In operation, the birds are deposited on the upper surface 27 on the bottom wall 26 of trough 25 adjacent the infeed end 30 thereof. As the trough 25 is moved to the right as seen in FIG. 1 along the conveying path P, the bird moves therewith since the surface 26 on trough 25 is such that frictional contact is maintained with the bird. When the trough 25 moves to the left as seen in FIG. 1, the angle of inclination of the bottom wall of trough 25 is such that frictional contact is reduced with the bird, thereby allowing the trough 25 to move with respect to the bird. Thus, during each reciprocal cycle of the trough 25, there is a net movement of the bird along the trough from the left to the right as seen in FIG. 1 so that the bird is conveyed toward the downstream end 31 of trough 25. Usually, a plurality of workers stand on opposite sides of trough 25 to manually unload the birds from trough 25 as the birds move therealong. If the birds are not unloaded before they reach the downstream end 31 of trough 25, the abutment member 32 will keep the birds in the trough with the birds reciprocating back and forth with the trough without significant movement with respect to the trough.

Figure 7:
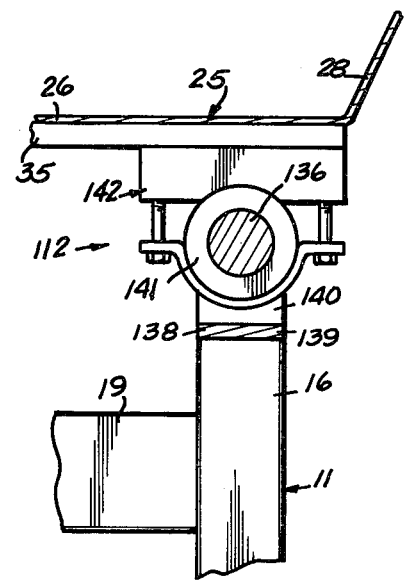
FIG. 7 is a cross-sectional view taken along line 7—7 in FIG. 6.

FIGS. 6 and 7 illustrate an alternate embodiment of the mounting assemblies designated by the numeral 112 which may be used in lieu of the mounting assemblies 12 previously described. The mounting assembly 112 includes a slide rod 136 which is fixedly mounted on the upper end of the associated post 16 with a U-shaped mounting bracket 138. The mounting bracket 138 has a central web 139 which is attached to the top of the post 16 with opposed upstanding legs 140 integral with opposite ends of the central web 139 and extending upwardly therefrom. The slide rod 136 extends between and is attached to the upstanding legs 140 on the mounting bracket 138 so that the slide rod 136 is spaced above the central web 139 of the bracket 138. The bracket 138 orients the slide rod 136 so that it extends longitudinally of the support frame 11.

The mounting assembly 112 also includes a bushing 141 slidably mounted on the slide rod 136 for sliding movement back and forth between the upstanding legs 140 on the mounting bracket 138. The bushing 141 is made of a low friction material such as one of the commercially available plastic bearing materials. The bushing 141 is fixedly attached to the reinforcing plate 35 on the conveyor trough 25 through a mounting clamp 142 which clamps the bushing 141 therein so that the bushing 141 moves back and forth along the slide rod 136 as the conveyor trough 25 is reciprocated by the drive assembly 15.

The slide rods 136 in mounting assemblies 112 are horizontally oriented while the bottom wall 26 of the conveyor trough 25 angles slightly downwardly from the infeed end 30 to the downstream end 31 similarly to that disclosed for mounting assemblies 12. Thus, the mounting assemblies 112 cause the trough 25 to move along a horizontal path as it is reciprocated back and forth but remains inclined as it is reciprocated. This causes the birds to move along the bottom wall of the trough 25 from the infeed end 30 to the downstream end 31 similarly to that described with mounting assemblies 12.

It is likewise to be understood that other constructions may be used for the mounting assemblies. Such constructions should mount trough 25 so that it is horizontally reciprocated while the bottom wall 26 of trough 25 is inclined from the infeed end to the downstream end.

It is sometimes desirable to allow any liquids such as water on the birds to drain therefrom as they are conveyed by the conveyor 10. This is especially true after washing and chilling operations where the birds are either submerged in water or have water sprayed thereon. With the conveyor trough 25, the angle of inclination of the bottom wall 26 at the trough 25 is such that the liquid tends to drain from the infeed end 30 toward the downstream end 31 thereof so that the water can be discharged off the bottom wall 26 through the opening 34 under the abutment member 32. One of the problems with a flat bottom wall 26 such as that disclosed in FIGS. 1–5 is that the liquid draining from each bird on the bottom wall 26 flows down against the birds downstream thereof. When the trough 26 is substantially filled with birds being conveyed thereby, it is difficult to achieve enough space between the birds thereon to allow the liquid to freely flow along the length of the trough 25 so that it can be discharged.

Figure 8:
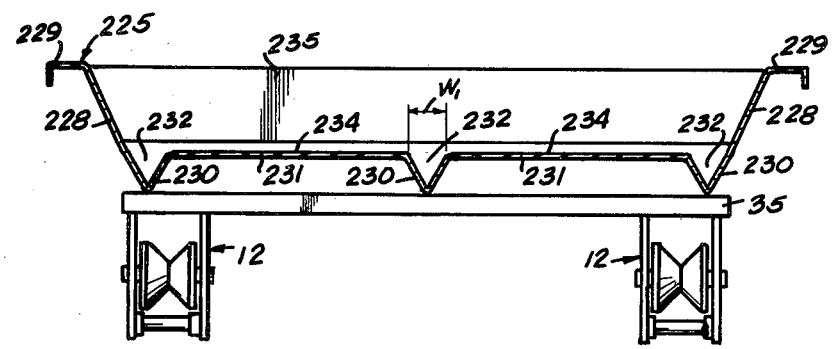
FIG. 8 is a transverse cross-sectional view of a second embodiment of the conveyor trough assembly.

FIG. 8 shows an alternate embodiment of the conveyor trough which has been designated by the numeral 225 and which is designed to facilitate the drainage of liquid from the birds being transported in the trough 225. The trough 225 conforms generally in overall configuration to the trough 25 with a bottom wall 226 and side walls 228 along opposite edges thereof equipped with lips 229 along their upper edges. Rather than being substantially flat, however, the bottom wall 226 has formed therein a plurality of V-shaped sections 230 which are spaced apart across the width of the bottom wall 226 and extend longitudinally along the length of the trough 225. This provides substantially flat sections 231 between the V-shaped sections 230. The V-shaped sections 230 thus define longitudinally extending grooves 232 therein which open onto the upper surface 234 of the flat sections 231. The grooves 232 have an opening width $w_1$ which is sufficiently small for the birds to not significantly drop down into the grooves 232 and be supported on the substantially flat surfaces 234 on top of the flat sections 231 in bottom wall 226. Thus, the liquid draining out of the birds can flow over the flat sections 231 into the grooves 232. The liquid can then freely flow along grooves 232 longitudinally of the bottom wall 226 and out of the downstream end thereof under the abutment member 235. This increased drainage capability allows some of the draining operations normally requiring other pieces of equipment in the poultry processing plant to be eliminated. The trough 225 is mounted on the reinforcing members 35 similarly to that of trough 25 enumerated above. Mounting assemblies 12 as illustrated or mounting assemblies 112 mount the trough 225 on frame 11 so that the conveying operation of the trough 225 is similar to that described for the trough 25.

Figure 9:
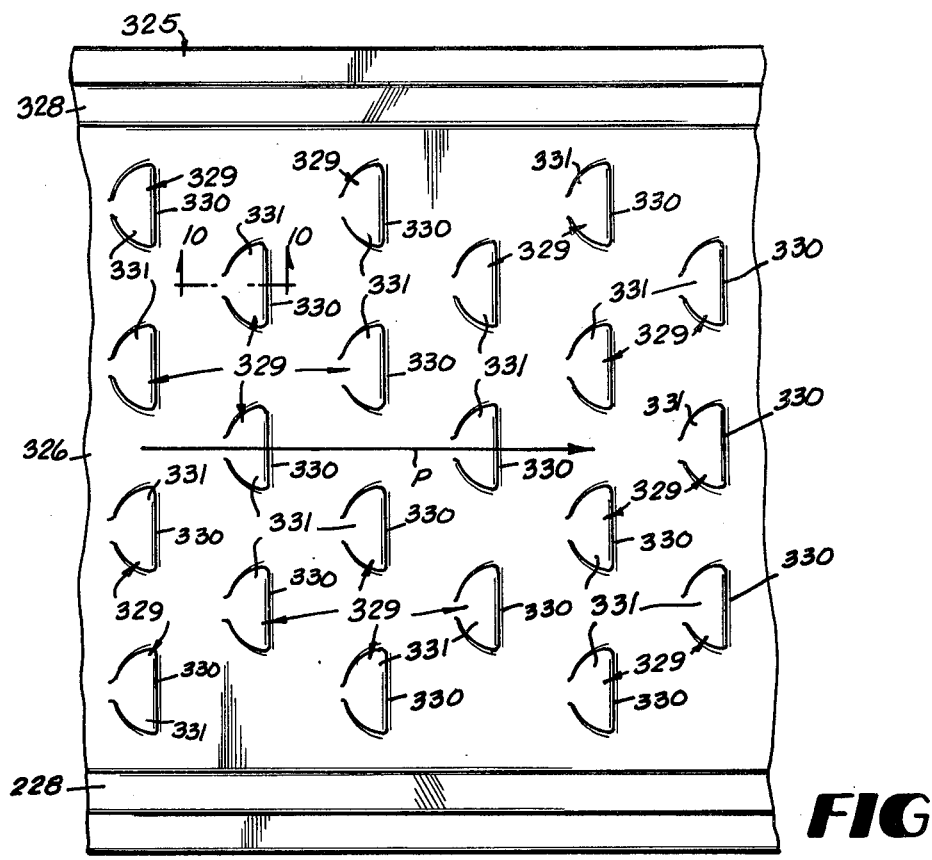
FIG. 9 is a partial top plan view of a third embodiment of the conveyor trough assembly.
Figure 10:
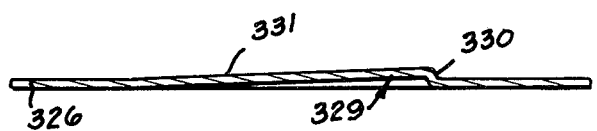
FIG. 10 is an enlarged cross-sectional view taken along line 10—10 in FIG. 9.

FIGS. 9 and 10 illustrate a third embodiment of the conveyor trough which has been designated 325. The trough 325 conforms generally to the trough 25 with a bottom wall 326 and upstanding side walls 328 along opposite sides thereof. The bottom wall 326 is generally flat but defines a plurality of raised sections 329 therein. These raised sections 329 may be randomly located or ordered in arrangement. Each section 329 defines a leading surface 330 thereon facing the downstream end of the trough 325 and a trailing surface 331 facing the infeed end of the trough. The leading surface 330 angles upwardly from the flat portion of wall 326 at a greater angle than that of the trailing surface 331. The angle of surfaces 331 is such that, as the trough 325 is moved in the direction from the downstream end toward the infeed end (to the left as seen in FIG. 9), birds in the trough 325 can slide up over the trailing surfaces 331 to allow the bottom wall 326 to shift with respect to the birds. The angle of the surfaces 330 is such that, as the trough 325 is moved in the direction from the infeed end toward the discharge end (to the right as seen in FIG. 9), birds in the trough 325 will be engaged by the surfaces 330 to cause the birds to move with the trough 325. This allows the angle of inclination of the bottom wall 326 of trough 325 to be reduced so that it is substantially horizontal while still causing the birds to move along the bottom wall of the trough from the infeed end toward the downstream end as the trough 325 is reciprocated as described for trough 25. While the raised sections 329 are illustrated as semicircular in shape, it is to be understood that the sections 329 may have any convenient shape.

What is claimed as invention is:

1. A poultry conveyor for conveying birds in a poultry processing plant comprising:

a support frame;

an elongated conveying trough having an infeed end and an opposed downstream end and defining a conveying surface thereon extending along the length thereof and retaining means to maintain the birds on the conveying surface;

mounting means for movably mounting said conveying trough on said support frame for movement of said trough with respect to said support frame along a horizontal rectilinear path extending longitudinally of said conveyor trough, said mounting means including a plurality of mounting assemblies, each of said mounting assemblies including an elongate horizontally oriented inverted V-shaped angle member fixedly mounted on said support frame and extending longitudinally thereof, said angle member defining an elongate guide surface thereon; a guide roller rotatably mounted on said conveyor trough about a rotational axis extending transversely of and fixed with respect to said conveyor trough, said roller defining a peripheral V-shaped groove therearound adapted to rotationally engage said angle member to movably support said conveyor trough thereon; a pair of keeper plates mounted on said conveyor trough and located on opposite sides of said angle member when said roller is supported thereon; and at least one keeper pin mounted between said keeper plates and extending under said angle member to limit the vertical movement of said conveyor trough and maintain said groove in said roller in conforming contact with said angle member, said mounting assemblies mounting said conveyor trough so that said conveying surface angles with respect to the horizontal with said downstream end lower than said infeed end; and drive means for reciprocating said trough along said rectilinear path to cause birds deposited on said conveying surface on said conveying trough to be moved along said conveying surface from said infeed end of said trough toward said downstream end of said trough.

2. The poultry conveyor of claim 1 wherein said conveying surface is angled with respect to the horizontal to provide a drop of about ⅛-¼ inch per linear foot of conveying surface.

3. The poultry conveyor of claim 2 wherein said conveying trough is reciprocated by said drive means at a rate of about 100–150 cycles per minute.

4. The poultry conveyor of claim 3 wherein said conveying trough is moved a distance of about 3–4 inches during each reciprocal stroke thereof.

5. The poultry conveyor of claim 1 wherein said conveying surface is a flat planar surface.

6. The poultry conveyor of claim 1 wherein said conveying surface defines a plurality of spaced apart longitudinally extending grooves therein having a size such that the birds will be supported on said conveying surface without extending to the bottom of said grooves so that liquids can drain therealong.

7. The poultry conveyor of claim 1 wherein said conveying surface includes a plurality of upwardly projecting raised sections in said conveying surface adapted to engage and move the birds thereon as the conveyor trough is reciprocated, each of said raised sections defining a leading subsurface thereon facing the downstream end of said conveyor trough and a trailing subsurface thereon facing the infeed end of said conveyor trough, said leading subsurface angling upwardly from the plane of said conveying surface at an angle greater than the angle at which said trailing surface angles upwardly from the plane of said conveying surface so that poultry moves up and over said trailing subsurfaces as said conveyor trough is moved from said downstream end toward said infeed end and is engaged by said leading subsurfaces as said trough is moved from said infeed end toward said downstream end to move the poultry therewith.

* * * * *